Oct. 5, 1926.  H. B. KRAFT  1,601,739
BRAKE TESTING APPARATUS
Filed Feb. 18, 1926   2 Sheets-Sheet 1
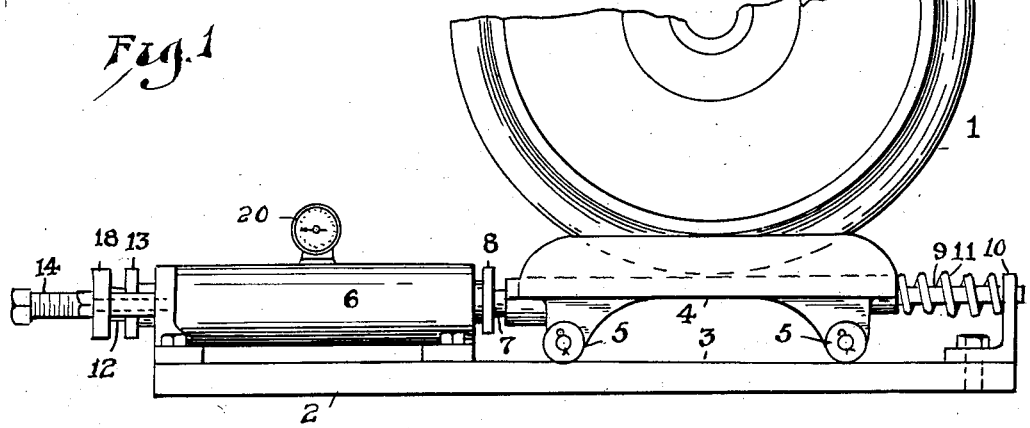
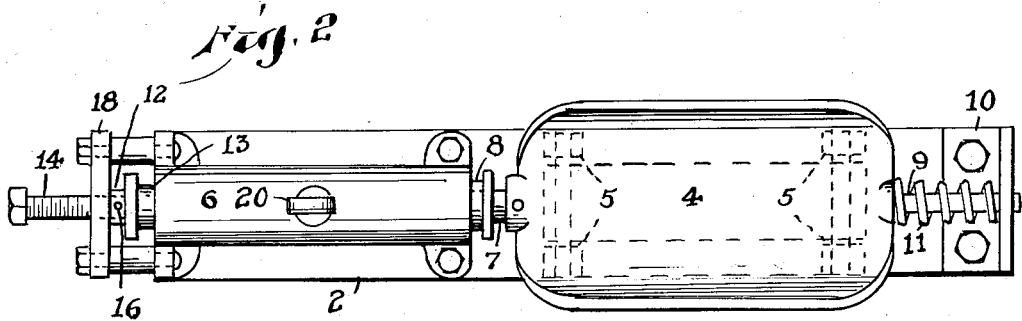
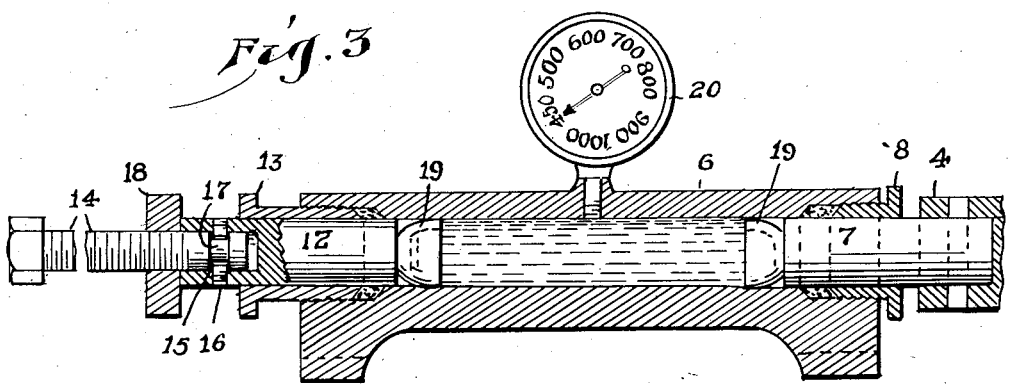
INVENTOR.
Harry B Kraft,
BY Edward A Lawrence,
his ATTORNEY.

Oct. 5, 1926. 1,601,739
H. B. KRAFT
BRAKE TESTING APPARATUS
Filed Feb. 18, 1926   2 Sheets-Sheet 2
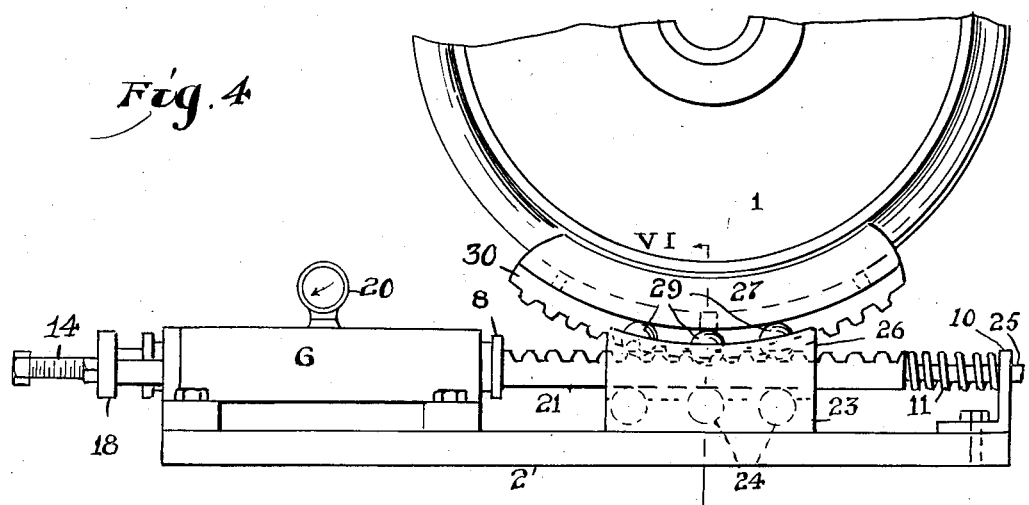
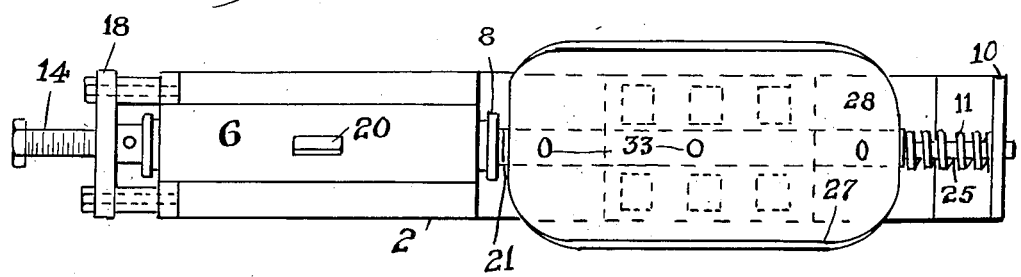
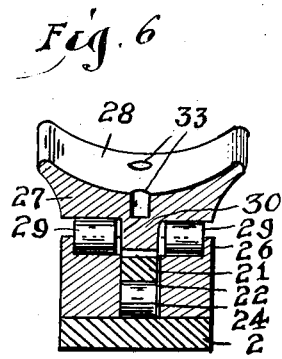
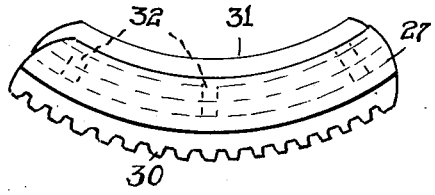
INVENTOR.
Harry B. Kraft.
BY Edward A. Lawrence,
his ATTORNEY.

Patented Oct. 5, 1926.

1,601,739

UNITED STATES PATENT OFFICE.

HARRY B. KRAFT, OF SHARON, PENNSYLVANIA.

BRAKE-TESTING APPARATUS.

Application filed February 18, 1926. Serial No. 89,024.

For the safe operation of automobiles and other power-driven vehicles, especially those provided with four wheel brakes, it is very important that when the brakes are applied that they be applied with equal braking force on all the wheels which are provided with brakes. Otherwise the vehicle will skid or swerve when the brakes are applied, and this dangerous tendency is greatly magnified when the brakes are quickly applied as in an emergency or where the road surface is slippery or sandy.

The proper measurement of the braking force is difficult as apparently slight differences have a very appreciable effect on the action of the brakes.

The object which I have in view is the provision of mechanism whereby the braking effect on the individual wheels may be accurately measured while the vehicle is at rest, as in a garage, so that the necessary adjustment to accurately equalize the brakes on all of the wheels may be effected without the hazard of trying out the brakes on the moving car.

Another object which I have in view is the provision of such a mechanism which may be manufactured and sold at a relatively small cost, which will be substantial and durable, and which may be used conveniently and expeditiously.

In general my improved brake-testing mechanism is characterized by a movable chair or platform upon which each of the brake wheels are in turn mounted, combined with means for forcibly moving the platform and thus causing the wheel to overcome the power of its brake and to be revolved, and means for indicating the force required to move the chair and revolve the wheel.

Novel features of construction, and also of arrangement of parts will appear from the following description.

In the accompanying drawings, wherein I have illustrated the best embodiments of the principles of my invention now known to me, Fig. 1 is a side elevation showing a vehicle wheel mounted on the brake-tester; Fig. 2 is a plan view of the brake-tester; Fig. 3 is a horizontal section of the hydraulic cylinder and piston mechanism by which the chair is moved; Fig. 4 is a view similar to Fig. 1 but showing a modification; Fig. 5 is a plan view of the form of brake-tester shown in Fig. 4; Fig. 6 is a sectional view of the tester taken along the line VI—VI in Fig. 4, and Fig. 7 is a side elevation of the form of chair shown in Figs. 4-6 inclusive, with a filler therein.

Referring first to Figs. 1, 2 and 3 of the drawings, 1 represents one of the wheels of a vehicle, the wheel being provided with the usual brake or braking means. 2 represents a bed plate, one end of which is integrally provided with the twin rails 3 on which the wheel-chair 4 is movably mounted as by the rollers 5 supporting said chair and running on the rails 3 as tracks. A hydraulic cylinder 6 is mounted on the bed plate 2 and 7 is a movable head in said cylinder extending from the one end thereof through a stuffing box 8 and attached to the front end of the chair 4. The other end of the chair 4 is provided with a guide bolt 9 which slides in a hole in an abutment bracket 10 mounted on the ends of the rails 3, a helical spring 11 being coiled about said bolt between the chair and the bracket to automatically return the chair toward the left in Fig. 1 when the hydraulic power is relieved in the cylinder 6.

At the other end of the cylinder 6 a piston 12 extends into the same through the stuffing box 13. 14 is a screw whose inner end is pivotally connected to the outer end of the piston 12 as by its insertion into an axial socket 15 in the outer end of the piston and held therein by the screw pins 16 extending through the wall of the socket and engaging a circumferential groove 17 on the screw 14. The screw 14 is screwed through a threaded hole in a cross-head 18 mounted on and in spaced relation to the end of the cylinder 6. The outer end of the screw 14 is provided with a squared head for the application of a wrench or spanner.

The inner end of the movable head 7 and the piston 12 are provided with flexible packing cups 19.

20 is a gauge mounted on and connected to the cylinder 6 to register the internal pressure thereof. The cylinder 6 contains water, oil, or some other non-compressible liquid.

In use the brakes are applied to the wheel 1 and the same is then jacked up and the tester placed in position with the chair 4 centered beneath the wheel and the jack is then lowered to deposit the wheel on the chair. A tool is then applied to the outer end of the screw 14 and the same turned to force the piston 12 inwardly in relation to the cylinder 6 and the process is continued until the movable head 7 and with it the chair 4 are moved toward the right against the influence of the braked wheel, thus overcoming the braking force and causing the wheel to rotate. The pressure required to rotate the wheel indicated on the gauge 20 is noted. The brakes may then be adjusted to obtain the desired braking force and to equalize them with the brakes of the other wheel or wheels. When the testing operation is over, the screw 14 is backed off, the wheel is jacked up and the tester removed and positioned under another wheel for a repetition of the operation.

In Figs. 4 to 6 inclusive, the movable head 7 has rigidly attached to its outer end the rack bar 21 which is slidable in the longitudinal groove 22 in a block 23 mounted on the bed plate 2 and on rollers 24 occupying sockets in the floor of said groove.

The outer end of the rack 21 is provided with a cylindrical end 25 which slides in the hole in the bracket 10, with the spring 11 coiled about said cylindrical portion of the rack bar between the bracket and the end of the angular portion of said rack bar.

The upper surface of the block 23 is arcuate and is provided on each side with a vertical flange 26 to hold the chair 27 against lateral movement. The chair 27 is arcuate and provided on its upper surface with a groove 28 to receive the tire of the wheel 1. The chair is supported longitudinally on the block 23 on the rollers 29 which occupy sockets in the top surface of the block. At its longitudinal center the chair 27 is provided with an arcuate rack 30 which meshes with the rack bar 21. It is evident that the chair may be moved relative to the block by the extension of the rack bar, thus causing the wheel 1 to rotate against the influence of the brakes so that the power of the brake may be indicated on the gauge 20.

To enable the chair to be accommodated to different tire radii and to different tire widths I provide false chairs 31 of proper receiving grooves to fit different radii and widths of tires, the same being adapted to fit into the main chair 27 and being provided with bottom studs 32 which fit into sockets 33 in the top surface of the chair 27.

What I desire to claim is:—

1. In a brake-testing apparatus, the combination of a movable chair upon which the wheel, with its brake set, is supported, said chair being movable in a substantially horizontal plane, power-driven means for moving the chair and thereby rotating the wheel against the influence of its brake, and means for indicating the power required to move the chair.

2. In a brake-testing apparatus, the combination of a chair upon which the wheel, with its brake set, is supported, said chair being arranged to slide in a substantially horizontal path, and power-driven means coupled to said chair and adapted to move it and thus rotate the wheel against the influence of its brake.

3. In a brake-testing apparatus, the combination of a movable chair upon which the wheel, with its brake set, is supported, hydraulic means for moving the chair and thus rotating the wheel against the influence of its brake, and means for indicating the power required to move the chair.

4. In a brake-testing apparatus, the combination of a movable chair upon which the wheel, with its brake set, is supported, a hydraulic cylinder, a movable head for said cylinder operatively connected to the chair to move the latter, piston means in said cylinder to exert force against said head, and means for indicating the power in said cylinder required to move said chair and rotate the wheel against the influence of its brake.

5. In a brake-testing apparatus, the combination of a movable chair upon which the wheel, with its brake set, is supported, a hydraulic cylinder, a movable head for said cylinder operatively connected to the chair to move the latter, means for increasing the pressure in said cylinder against said head, and means for indicating the pressure in said cylinder required to move the chair and thus rotate the wheel against the influence of its brake.

Signed at Sharon, Pa., this 10th day of February, 1926.

HARRY B. KRAFT.